United States Patent [15] 3,671,848
Shapiro et al. [45] June 20, 1972

[54] FREQUENCY CONVERSION WITH JOSEPHSON JUNCTIONS

[72] Inventors: Sidney Shapiro; Andrew Longacre, Jr., both of Rochester, N.Y.

[73] Assignee: The United States of America as represented by the Secretary of the Navy

[22] Filed: Aug. 27, 1971

[21] Appl. No.: 175,533

[52] U.S. Cl. ....................321/69 NL, 332/51 W, 333/83 R
[51] Int. Cl. ....................H02m 5/00
[58] Field of Search ..........321/60, 69 W, 69 NL; 332/51 W; 333/83 R

[56] References Cited

UNITED STATES PATENTS

| | | | |
|---|---|---|---|
| 2,970,275 | 1/1961 | Kurzrok | 321/69 NL |
| 3,287,568 | 11/1966 | Osterwalder | 321/69 W |
| 3,431,485 | 5/1969 | Lind et al. | 321/69 W |
| 3,443,199 | 5/1969 | Collins et al. | 321/69 W |
| 3,584,306 | 6/1971 | Spacek | 321/69 W |

*Primary Examiner*—William M. Shoop, Jr.
*Attorney*—R. S. Sciascia et al.

[57] ABSTRACT

Josephson junctions are utilized to accomplish frequency conversion—either down conversion or up conversion. The junction is coupled to a resonant cavity and simultaneously irradiated by an external source at frequency $f$, which differs from the resonant frequency of the cavity $f_c$. In order for an output to be produced at this frequency, $f_c$, the voltage bias across the junction must be at one of the values $V=h\ |\ (f_c\pm nf)\ |\ ]2e$, where $n$ is an integer and the absolute value is used since $nf$ may be larger than $f_c$.

4 Claims, 3 Drawing Figures

Sidney Shapiro
Andrew Longacre Jr.
*INVENTORS*

BY [signature]
Attorney

Sidney Shapiro
Andrew Longacre Jr.
*INVENTORS*

FREQUENCY CONVERSION WITH JOSEPHSON JUNCTIONS

The present invention relates generally to frequency conversion systems and, more particularly, to oscillator-mixer arrangements which utilize the nonlinear properties of junctions between superconductors.

When two superconductors are separated by a barrier which impedes but does not bar current flow between them, effects are observed associated with the transfer through the barrier of bound pairs of electrons characteristic of the superconducting ground state. These effects were first predicted theoretically by Josephson and bear his name. The DC Josephson effect refers to the fact that current from an external source may be driven through the barrier without developing any voltage difference across the barrier. The maximum zero-voltage current is a function of magnetic field and varies through a series of zeros and local maxima as a magnetic field is monotonically increased. Above some critical magnetic field, which depends on the nature of the junction, no zero-voltage current flows. This periodiclike dependence of zero-voltage Josephson current on magnetic field is probably the clearest evidence for the existence of the DC effect.

The AC Josephson effect refers to the fact that when a finite voltage difference is maintained across the barrier, paired electrons pass through the barrier in such a way that the associated current is periodically oscillating. The frequency of this alternating current is proportional to the voltage difference and is given by the Josephson frequency-voltage relation $$2eV = hf_j \quad (1)$$

where $V$ is the voltage difference across the barrier, $f_j$ is the frequency of the AC Josephson current, $e$ is the magnitude of the charge on the electron, and $h$ is Planck's constant. A voltage difference of 100 $\mu$ yields a frequency of 48.36 Gc/sec.

Two types of barrier systems have been investigated extensively with respect to the DC and AC Josephson effects. In one type, the two superconductors, frequently in thin-film form, are separated by a very thin dielectric layer, e.g., an oxide of one of the metals. Transfer of electron pairs through the dielectric, which constitutes the barrier in this configuration, occurs via the mechanism of quantum-mechanical tunneling and such systems are referred to as tunnel junctions. The probability that an electron pair impinging on the dielectric barrier will pass through is governed by the overlap in the barrier of exponentially decaying wave-functions, and, typically, is very small. This is the weak-coupling limit of the Josephson effect and is the case to which almost all detailed theory has so far been limited.

The other type of barrier system that has also received extensive experimental attention consists of a thin-film superconductor that is divided in two by a very short and very narrow constriction (a few microns wide and a few tenths of a micron long). Such a system is referred to as a superconducting bridge. Pair transfer through the bridge, which constitutes the barrier in this configuration, occurs by conduction processes and with relatively high probability. This is the strong-coupling limit of the Josephson effect in which behavior similar to that of type-II superconductors is encountered.

Another barrier configuration, which makes use of bulk superconductors, has come in for considerable attention. It is formed by a point contact between two superconductors. The Josephson effects in such a system can be varied from those characteristic of thin-film tunnel junctions to those characteristic of thin-film bridges, by adjusting the pressure of the point contact between the two superconductors.

Microwave radiation generated by the AC Josephson effect has been directly observed from both tunnel-junction and point-contact barrier systems. The simplest evidence, however, for the existence of the AC effect in any given experimental situation is probably the appearance in the DC voltage-current characteristic of current steps at constant voltage when the barrier system is exposed to monochromatic radiation. The observation of these steps, also predicted by Josephson, constituted the first experimental evidence for the AC effect. The steps come about from the frequency modulation of the Josephson currents by RF voltages driven by the applied radiation. This follows form Equation (1) where $V$ is to be taken as the instantaneous voltage across the barrier. Whenever one of the modulation sidebands occurs at zero frequency, a current step appears in the $V$–$I$ characteristic. Equation (2), which was derived on the basis of the frequency-modulation picture, gives the expression for the Josephson current $j$ in the presence of applied radiation at frequency $f$, (2)

$$j/j_0 = \sum_{r=-\infty}^{\infty} J_r\left(\frac{2ev}{hf}\right) \sin\left[(2\pi f_j t + \varphi_o) + r(2\pi f t + \theta)\right]$$

where $J_r(x)$ is the Bessel function of order $r$, $J_{-n}(x) = (-1)^n J_n(x$, the applied radiation is $\nu \cos(2\pi f t + \theta)$, $j_o$ is the Josephson current parameter which depends upon temperature and the nature of the barrier, and $\theta_o$ is the initial phase of the AC Josephson current. This shows the appearance of current steps at voltages $$hf_j = 2eV = nhf. \quad (3)$$

A detailed derivation from microscopic theory has been carried out by Werthamer who shows that additional terms are also present in the expression for the current.

It is now well known that a Josephson junction, coupled to a resonant cavity, forms a source of radiation when it is biased to the voltage $V = hf_c/2e$, where $f_c$ is the resonant frequency. The present invention differs from this technique in that, instead of being concerned with utilizing the properties of the Josephson junction as a voltage tuned RF oscillator, the present invention utilizes the Josephson effect to accomplish frequency conversion. Thus, the junction is again coupled to a resonant cavity but now is simultaneously irradiated by an external source at a frequency, $f$, which differs from the resonant frequency of the cavity $f_c$. Furthermore, in order for an output to be produced at this frequency, $f_c$, the voltage bias must be at one of the values $V = h\,|\,(f_c \pm nf)\,|\,/2e$, where $n$ is an integer and the absolute value is used since $nf$ may be larger than $f_c$.

This frequency conversion may be either down conversion, in which case the output frequency, the cavity frequency $f_c$, is less than the input frequency $f$, or up conversion, in which case the output frequency is higher than the input frequency. In one practical embodiment of the invention, the apparatus accomplished down conversion from about 75 GHz to about 20 GHz; in another, up conversion from about 25 GHz to about 500 GHz was achieved.

It is accordingly a primary object of the present invention to perform frequency conversion either in an upwardly or downwardly direction by means of Josephson junctions.

Another object of the present invention is to utilize the nonlinear properties of junctions between superconductors to achieve frequency conversion.

A still further object of the present invention is to provide a Josephson frequency converter wherein a point-contact type junction is coupled to two separate resonators.

A still further object of the present invention is to utilize Josephson devices in a combined oscillator-mixer mode to accomplish frequency conversion whereby the usefulness of these junctions as highly sensitive RF detectors may be extended to the millimeter and submillimeter region.

Other objects, advantages and novel features of the invention will become apparent from the following detailed description of the invention when considered in conjunction with the accompanying drawings wherein.

As mentioned hereinbefore, the fundamental operating principle of the present invention is that when a Josephson junction is (1) irradiated with a signal of frequency $f$, (2) strongly coupled to an electromagnetic resonance of frequency $f_c$, and (3) biased with the DC voltage $V = h|nf \pm f_c|/2e$, then the resonance is excited by the junction and radiation can be coupled out of the resonance at the resonant or intermediate frequency. Alternatively, the junction may be coupled to two resonances, one at the signal frequency, $f$, and the other at the intermediate frequency heretofore called $f_c$, which modification leads to a higher efficiency of conversion.

Figure 1:
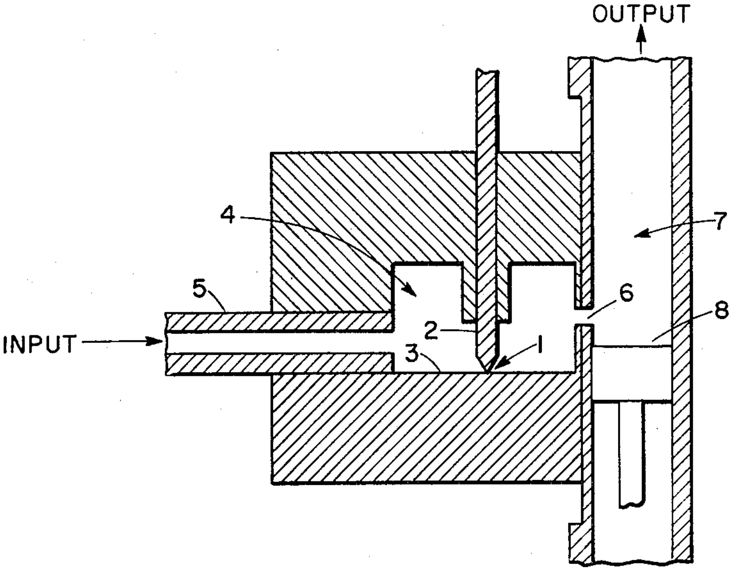
FIG. 1 depicts an embodiment of the invention which illustrates its fundamental operating principle.

Referring now to FIG. 1 of the drawings, it will be seen that a Josephson junction 1 of the point-contact type formed by a superconducting tin point 2 in contact with a superconducting niobium surface 3 is positioned in the center of a cylindrical cavity resonator 4. In this coaxial position, as is well known, there is a good impedance match between the junction and the cavity. More specifically, the junction is strongly coupled to the cavity's dominant TEM mode which, in one particular embodiment, is resonant at 20 GHz.

Although not shown, the arrangement includes an appropriate provision for insuring careful control over the contact pressure between both elements of the Josephson junction.

An external source of radiation at the frequency, $f$, previously identified, is directed onto the Josephson junction by a wave guide section 5 which opens into the cavity 4 through a sidewall portion. In the embodiment alluded to, this irradiating signal was at 75 GHz. Through another opening 6 in the cavity sidewall, the dominant TEM mode is coupled to another wave guide section 7 for extracting radiation at the resonant frequency. A sliding short 8 is included to provide some degree of tuning.

The entire apparatus, it will be appreciated, is immersed in liquid helium, for example, to establish the superconducting state in the niobium and tin. The voltage bias for the junction is obtained by the usual practice of passing a large measured current through a small, accurately known resistance which is in parallel with the junction.

Figure 2:
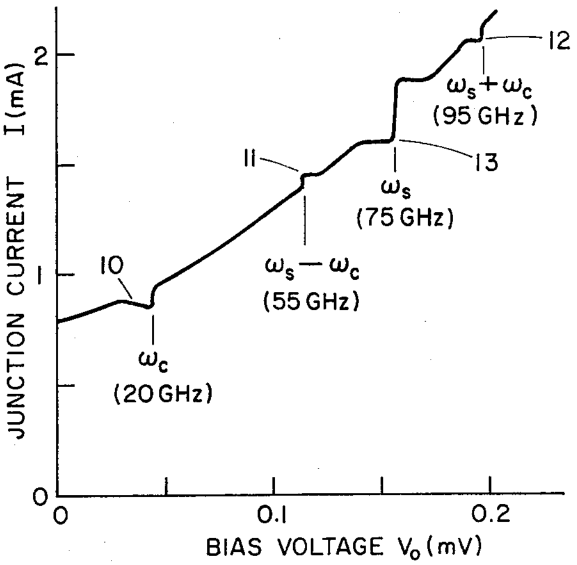
FIG. 2 shows the current versus bias voltage performance curve of the apparatus of FIG. 1.

When the Josephson junction, in or out of a resonator, is irradiated with radio frequency energy, as mentioned hereinbefore, current steps in its I–V characteristic appear at those voltages which correspond to harmonics of the radio frequency. Similarly, when the junction is tightly coupled to a high-Q resonator and biased to produce currents at the resonant frequency, other characteristic steps appear in the same curve. For example, in the apparatus of FIG. 1, steps occur whenever there is an AC current of 20 GHz flowing in the junction. This happens first when the junction is biased at a voltage corresponding to 20 GHz, and the resultant step is shown in the curve of FIG. 2 at location 10. Similar steps also occur when the junction, as is the case in FIG. 1, is illuminated with 75 GHz radiation while biased at voltage levels corresponding to either 95 GHz or 55 GHz. This result is shown by the two small steps 11 and 12 on opposite sides of the large step 13 induced by the 75 GHz irradiating signal. The same pattern of two small I–F steps bracketing the larger step may also be observed at harmonics of the 75 GHz signal.

The location, shape and RF power dependence of the sum and difference steps confirm that they arise by way of Josephson frequency conversion. For instance, the step 12 at 95 GHz appears because at the particular bias voltage corresponding to this frequency the junction converts the energy in the 75 GHz irradiating signal into 20 GHz which excites the resonant cavity. The higher order sum and difference steps, not shown, indicate a similar interaction involving the $n$th harmonic of the 75 GHz signal generated in the junction. Steps have been observed up to the eighth harmonic, demonstrating the feasibility of Josephson frequency conversion from 600 GHz to 20 GHz.

In a very similar embodiment of the invention in which $f_c$ was at 9.5 GHz, radiation was detected coming out of the cavity whenever the junction was DC biased at $V = h|nf \pm f_c|/2e$, i.e., on a sum or difference step.

Coupling the Josephson junction to a radiation field requires a rather severe impedance transformation which, as noted hereinbefore, may be achieved by locating the junction at a low impedance point of a resonator coupled to that field. However, the coupling of the signal via a waveguide only, as in the embodiment of FIG. 1, is relatively inefficient.

Figure 3:
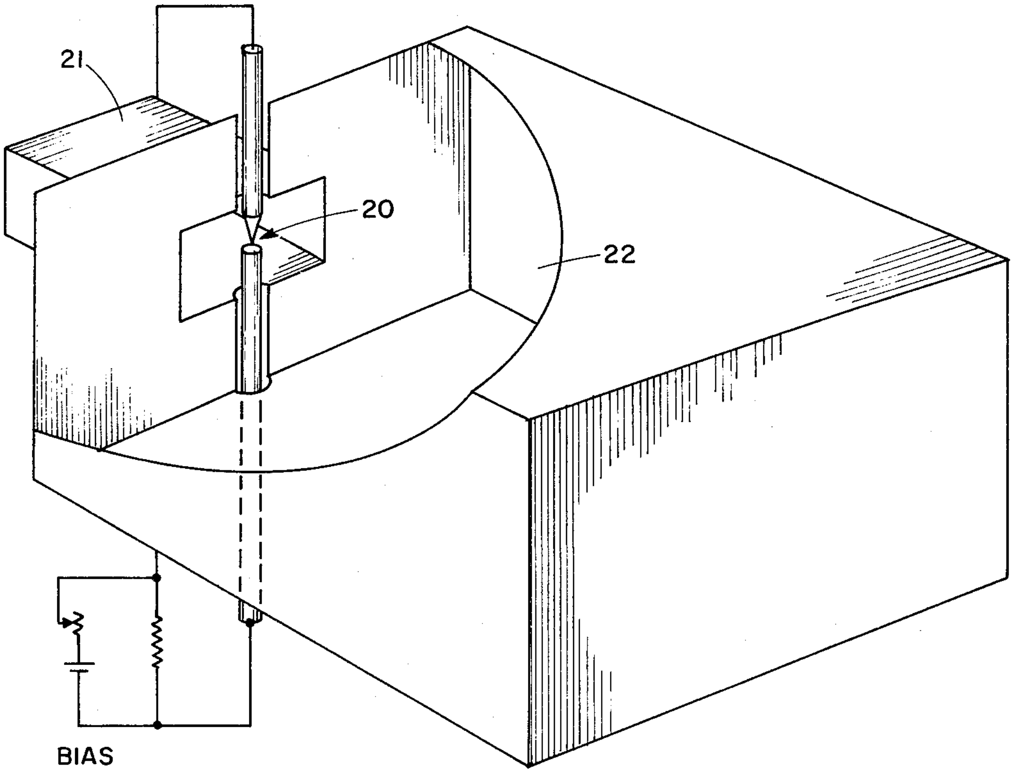
FIG. 3 schematically illustrates one arrangement for coupling the Josephson junction to both signal and intermediate frequency resonators.

In FIG. 3 there is schematically illustrated an arrangement for achieving more efficient frequency conversion than that shown in FIG. 1. The point-contact junction 20 is coupled to two resonators 21 and 22. Resonator 21, the smaller, is resonant at the irradiation frequency, and its companion 22 is resonant at the 20 GHz I–F frequency. The Josephson junction may be biased to the sum or difference frequency level corresponding to the 55 GHz or 95 GHz frequencies. The smaller cavity in this particular configuration is resonant in the $TE_{011}$ mode at the signal frequency, and the larger one also resonates in this mode at the intermediate frequency. These modes are particularly well suited for coupling to external waveguides.

In the illustrated embodiment described above, the Josephson junction was of the point-contact form. However, it should be appreciated that any other form, such as the thin-film junction or the drop-form junction, may also be used with appropriate resonators.

It should be appreciated that the materials utilized in the Josephson junction will be governed by the operating frequency range of the system.

In sensitive detecting systems, frequency conversion or heterodyning techniques usually result in improvements in ultimate sensitivity by two or three orders of magnitude over passive or video techniques. Thus, the present invention represents an advance in the state of the art aimed towards extending to the millimeter and submillimeter region the usefulness of Josephson junction devices as highly sensitive RF detectors.

What is claimed is:

1. In a method of converting electromagnetic wave energy of a frequency, $f_1$, to a different frequency, $f_2$, the steps of
   positioning a Josephson junction within a cavity whose resonant frequency is $f_2$;
   irradiating said Josephson junction with electromagnetic wave energy of said frequency, $f_1$; and
   maintaining a voltage bias across said Josephson junction equal to $V = h\ |\ (f_2 \pm nf_1)\ |\ /2e$, where $n$ is an integer and $h$ is Planck's constant, whereby said cavity is excited by electromagnetic wave energy at said frequency $f_2$.

2. Apparatus for converting electromagnetic wave energy at a first frequency, $f_1$, to similar energy at a second frequency, $f_2$, comprising, in combination,
   a cavity having a resonant frequency which corresponds to said second frequency;
   a Josephson junction positioned within said cavity;
   means for irradiating said Josephson junction with electromagnetic wave energy at said first frequency; and
   means for biasing said Josephson junction with a voltage corresponding to $V = h\ |\ (f_2 \pm nf_1)\ |\ /2e$, where $n$ is an integer and $h$ is Planck's constant, whereby said cavity is excited at said frequency, $f_2$.

3. In an arrangement for converting the frequency of electromagnetic wave energy, the combination of
   a first cavity resonant at a first frequency, $f_1$;
   a second cavity resonant at a second frequency, $f_2$, said cavities sharing a common sidewall portion having an aperture therein which provides coupling between said cavities;
   a Josephson junction positioned within said aperture;
   means for coupling an electromagnetic signal at said first frequency, $f_1$, to said first cavity;
   means for biasing said Josephson junction with a DC voltage corresponding to $V = h\ |\ (f_2 \pm nf_1)\ |\ /2e$, where $n$ is an integer and $h$ is Planck's constant; and
   means for extracting electromagnetic wave energy at said second frequency, $f_2$, from said second cavity.

4. In an arrangement as defined in claim 3 wherein said first cavity is excited in the $TE_{011}$ mode by the electromagnetic wave energy coupled thereto and said second cavity is excited in the same mode.

* * * * *